United States Patent [19]
Sich et al.

[11] Patent Number: 5,518,304
[45] Date of Patent: May 21, 1996

[54] FILTER ARRANGEMENT AND MOUNTING IN RAILWAY BRAKE PIPE BRACKET

[75] Inventors: Gary M. Sich, Irwin; Gregory L. Johnston, Tarentum, both of Pa.; Ulf Stahmer, Hamilton, Canada

[73] Assignee: Westinghouse Air Brake Company, Wilmerding, Pa.

[21] Appl. No.: 291,220

[22] Filed: Aug. 17, 1994

[51] Int. Cl.⁶ .......................... B60T 15/42; B01D 35/30
[52] U.S. Cl. ............................... 303/28; 210/453
[58] Field of Search ........................ 188/352; 303/28–35, 303/2, 5; 55/498, 505, 502; 210/453, 429, 430, 431, 432

[56] References Cited

U.S. PATENT DOCUMENTS

| | | | |
|---|---|---|---|
| 1,847,964 | 3/1932 | Hull | 210/453 |
| 3,160,446 | 12/1964 | McClure et al. | |
| 3,716,276 | 2/1973 | Wilson et al. | |
| 3,944,264 | 3/1976 | Mong et al. | |
| 4,033,632 | 7/1977 | Wilson | |
| 4,830,438 | 5/1989 | Hart et al. | |
| 4,855,047 | 8/1989 | Firth | 210/453 |
| 5,342,519 | 8/1994 | Friedmann et al. | 210/453 |

FOREIGN PATENT DOCUMENTS 15529  7/1902  United Kingdom ............... 210/429

OTHER PUBLICATIONS

AB Single Capacity Freight Car Air Brake Equipment with the ABDX Type Control Valve Catalog, Westinghouse Air Brake Company, 1991.

Primary Examiner—Matthew C. Graham
Attorney, Agent, or Firm—Gary J. Falce

[57] ABSTRACT

A pipe bracket portion of a freight brake control valve having an improved filter arrangement. The pipe bracket portion has a first side with a service portion and an emergency portion mounted thereto. The pipe bracket portion has a second side with a brake pipe, a brake cylinder, a emergency reservoir and an auxiliary reservoir thereto. The pipe bracket portion is provided with a cavity designed for containing a generally cylindrical filter therein. A retaining nut secures the filter in the cavity and provides a seal between the outer circumference of one end of the cylindrical filter and the pipe bracket portion. A first cavity portion and a second cavity portion are thus formed within the cavity in which the first cavity portion houses the cylindrical filter, and the second cavity portion has at least one radial port for delivering air. The retaining nut has a throughbore to permit air flow from the first cavity portion to the second cavity portion and has one or more spaced raised portions extending into the second cavity portion to provide radial airflow from the second cavity portion to the radial ports.

7 Claims, 4 Drawing Sheets

FILTER ARRANGEMENT AND MOUNTING IN RAILWAY BRAKE PIPE BRACKET

BACKGROUND OF THE INVENTION

1. Field of the Invention

The invention relates generally to brake control valve devices for railway cars and more particularly to filtering means provided at an accessible location in said brake control valve pipe brake portion.

2. Description of the Prior Art

Typical freight brake control valves such as the ABD, ABDW, DB-60 and ABDX-type control valves, are comprised of a pipe bracket portion having a service portion and an emergency portion mounted on opposite sides or faces thereof. Such a typical control valve is shown in prior art FIG. 1. Typically, a third side of the pipe bracket portion has a number of connections for fitting the pipe bracket portion to the brake pipe, the brake cylinder, the brake cylinder retaining valve, emergency reservoir and the auxiliary reservoir. Pipe bracket portions typically contain a removable strainer or filter at some location of the pipe bracket which minimizes the passage of dirt particles to the valve and the brake cylinder from the brake pipe line. As can be seen in prior art FIG. 1, a threaded nut is typically used to secure the filter. The mounting of the service portion and the emergency portion on opposed sides of the pipe bracket with connections on a third side thereof (commonly known as a standard AB-type pipe bracket), makes it somewhat difficult to access the valve portions in installation and removal. Providing the service portion and emergency portion on the same side of the pipe bracket (a single-sided pipe bracket) would improve access to the portions. Such single sided pipe bracket is shown in copending patent application Ser. No. 08/306,790, which is hereby incorporated by reference. However, the filter mounting and retainer nut known in the art are not readily adapted for such a single-sided pipe bracket.

SUMMARY OF THE INVENTION

It is, therefore, an object of the present invention to incorporate a single-sided pipe bracket into a railway freight brake control valve so as to make easier access to the retaining nut, filter and the auxiliary reservoir, the emergency reservoir, brake pipe, the brake cylinder connections, and preferably a brake cylinder retaining valve.

It is another object of the invention to provide a filter mounting arrangement compatible with such a single-sided pipe bracket while providing brake pipe air flow to the service and emergency portions of the railway freight brake control valve, while utilizing the cylindrical filter cartridge of the prior art devices.

Another object of the present invention is to provide an improved retaining nut means which is engagable to the pipe bracket in order to secure the filter and which allows repositioning of the filter cartridge such that the front to back depth of the pipe bracket may be minimized. This narrowed depth of the pipe bracket provides the advantages of minimizing space requirements, weight and material costs. Such retaining nut simultaneously provides for the passage of air flow from the brake pipe to the service and emergency portions of the railway freight brake control valve.

Briefly, these objectives are accomplished by providing an improved, single-sided pipe bracket portion for use in a railway freight brake control valve of a rail freight vehicle. The pipe bracket portion further has an improved brake pipe pressure filter arrangement and filter retaining nut. The freight brake control valve is of the type having provisions for connection to a brake pipe, a brake cylinder, an emergency reservoir, an auxiliary reservoir and preferably a brake cylinder retaining valve. The control valve further has a service portion and an emergency portion mounted to the pipe bracket portion.

The pipe bracket portion has a first side and an oppositely directed second side. The pipe bracket portion first side is provided with means for mounting both the service portion and the emergency portion to this pipe bracket portion first side. The second side of the pipe bracket has means for connecting to pipe work communicating with the brake pipe, the brake cylinder, the brake cylinder retaining valve, the emergency reservoir and the auxiliary reservoir on the pipe bracket portion second side.

A cavity means is provided in the pipe bracket portion which opens to the first side of the pipe bracket portion. The cavity means is designed for mounting a generally cylindrical filter therewithin. The axis of the filter is preferably generally perpendicular to the first side of the pipe bracket portion.

The pipe bracket portion further has retaining nut means for securing the cylindrical filter in the cavity means and for providing sealing between an outer circumference of one end of the cylindrical filter and the pipe bracket portion. In this manner, a first cavity portion and a second cavity portion are formed within the cavity means. The first cavity portion houses the cylindrical filter, and the second cavity portion is provided with at least one radial port for delivering air. The retaining nut is further provided with a throughbore to permit air flow from the first cavity portion to the second cavity portion. Also, the retaining nut means has at least one raised portion extending into the second cavity portion. The one or more raised portions are radially spaced around the retaining nut means to provide radial airflow from the second cavity portion to the one or more radial ports. Preferably, the raised portions extend into the second cavity portion beyond the radial port.

It is further preferred that the retaining nut means is threadably engaged to the pipe bracket portion intermediate to the first cavity portion and the second cavity portion. Preferably, the raised portions of the retaining nut provide a surface for supporting a gasket mounted on a side of either the emergency portion or the service portion, preventing the gasket from moving into the radial port.

Other objects and advantages of the invention will become apparent from a description of certain present preferred embodiments thereof shown in the drawings.

DETAILED DESCRIPTION OF THE PREFERRED EMBODIMENT

Figure 1:
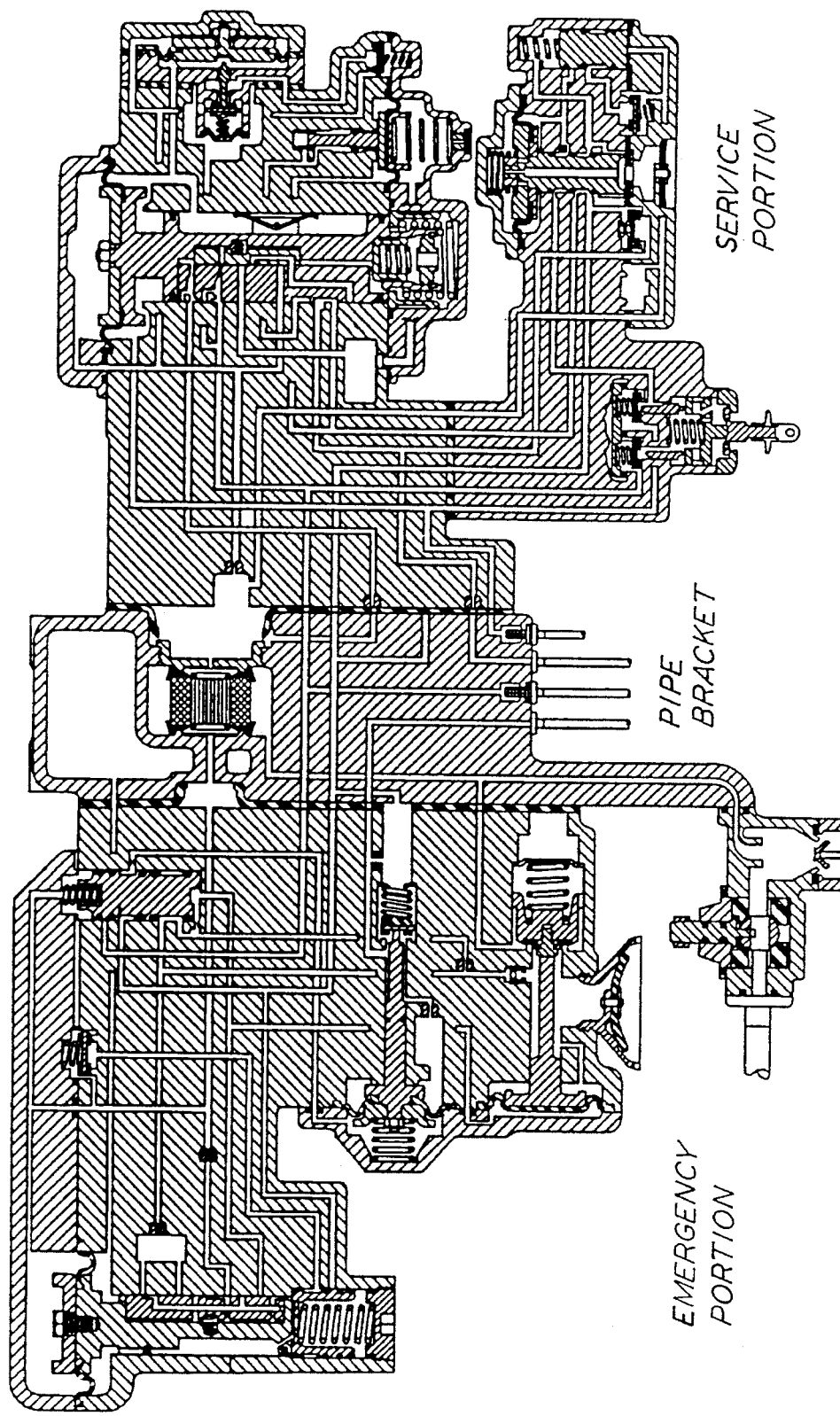
FIG. 1 is a prior art freight brake control valve showing the pipe bracket portion, the emergency portion and the service portion.
Figure 2:
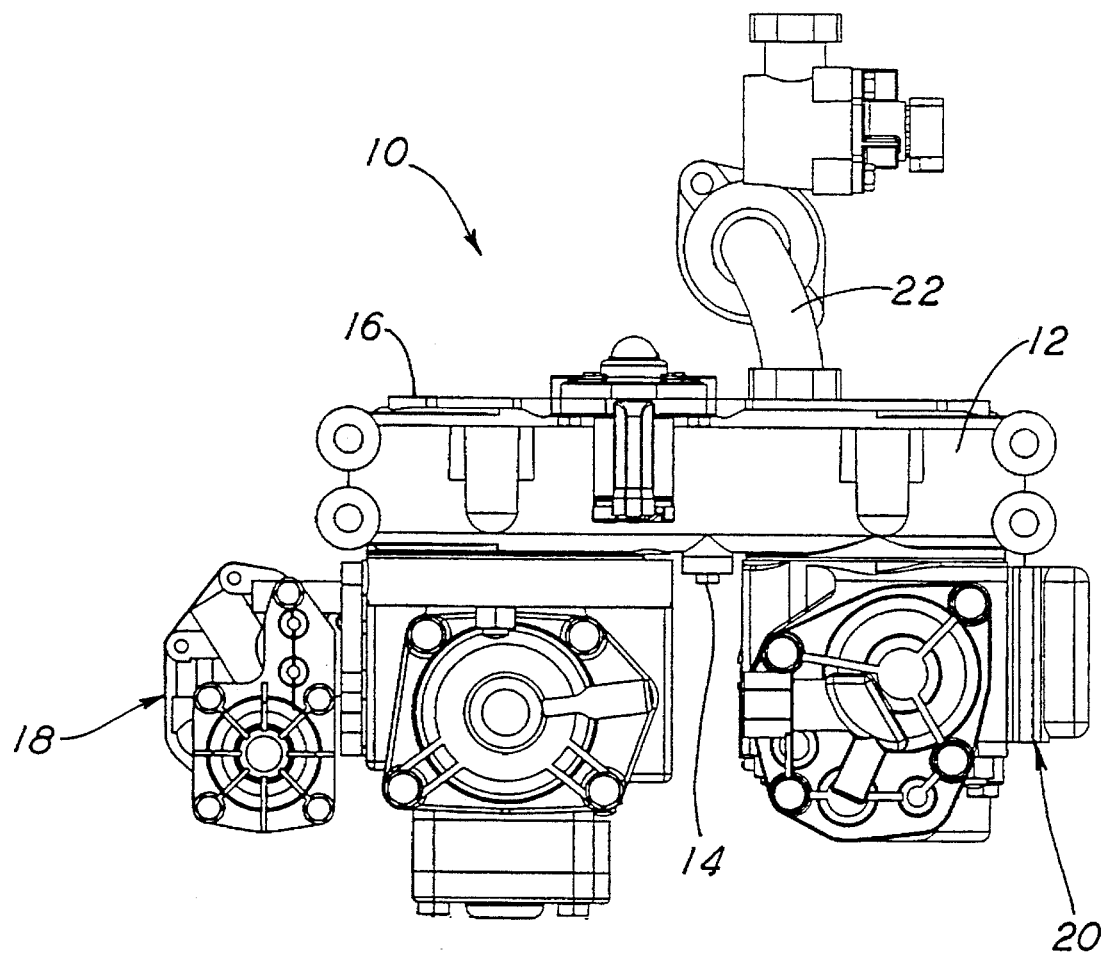
FIG. 2 is a top plan view of the preferred control valve showing the preferred pipe bracket portion, the emergency portion and the service portion.

As can be seen in prior art FIG. 1, the air brake industry has heretofore incorporated pipe brackets in freight brake control valves which have the emergency portion and service portion thereof mounted on opposite sides of the pipe bracket portion. The drawbacks associated with this design are described above. FIG. 2 shows a preferred railway freight control valve incorporating the preferred single-sided pipe bracket portion. The preferred single-sided pipe bracket portion 12 has a first side 14 and a second side 16 directed oppositely to one another.

The pipe bracket portion first side 14 has an emergency portion 20 and service portion 18 mounted thereto. A brake pipe connection 22 which connects the brake pipe (not shown) to the pipe bracket portion is provided at the second side 16 of the pipe bracket portion 12. A brake cylinder line, preferably a brake cylinder retaining valve line, an emergency reservoir line and an auxiliary reservoir line (shown in FIG. 1 but not shown in FIG. 2) are also connected to the second side 16 of the pipe bracket portion 12.

Figure 3:
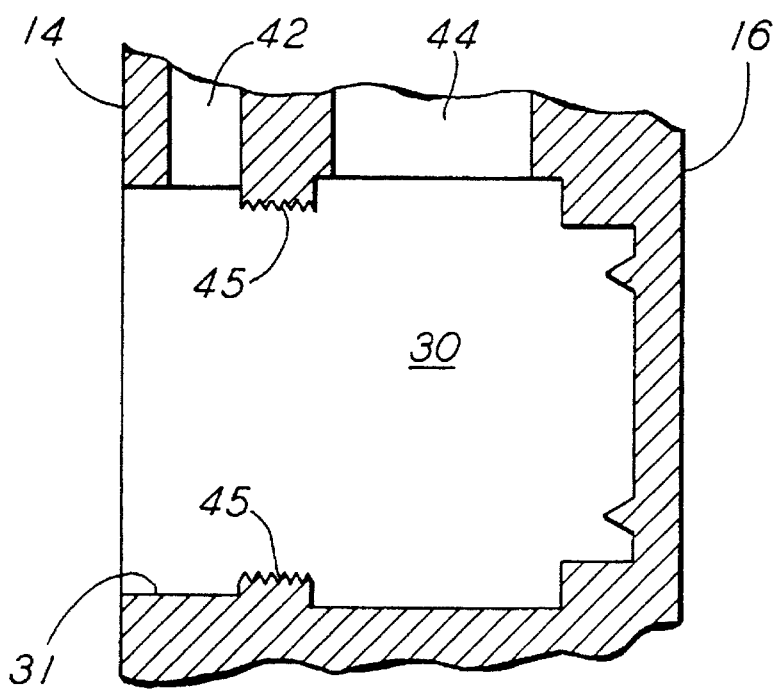
FIG. 3 is a cross sectional view taken in elevation of the preferred pipe bracket portion without the filter and retaining nut.

Referring to FIG. 3, a cross sectional cutaway of the preferred pipe bracket portion 12 is shown in which the filter, filter mounting means and gasket are removed to show the passageways within the pipe bracket portion. A cavity 30 is provided in the brake pipe portion 12 which opens to the first side 14 of the pipe bracket portion 12 through cavity opening 31. The preferred single-sided pipe bracket portion in which the service portion and emergency portion are mounted on the same side, has either the emergency portion or the service portion mounted thereto at cavity 30. A port 42 is also provided which connects to cavity 30. Whichever of the service portion 18 and emergency portion 20 that is not mounted adjacent the cavity 30 is connectable to the cavity 30 by port 42. It is preferred that the emergency portion 20 is mounted adjacent the cavity 30 so as to communicate with cavity 30 by cavity opening 31. It is further preferred that the service portion 18 communicates with cavity 30 through port 42. A brake pipe air inlet 44 is provided which connects cavity 30 to the brake pipe via connection 22. Air typically enters the pipe bracket portion 12 from the brake pipe through brake pipe inlet 44. Threaded portion 45 is provided on the pipe bracket portion 12 circumferentially within cavity 30 intermediate to the brake pipe inlet 44 and the radial port 42.

Figure 4:
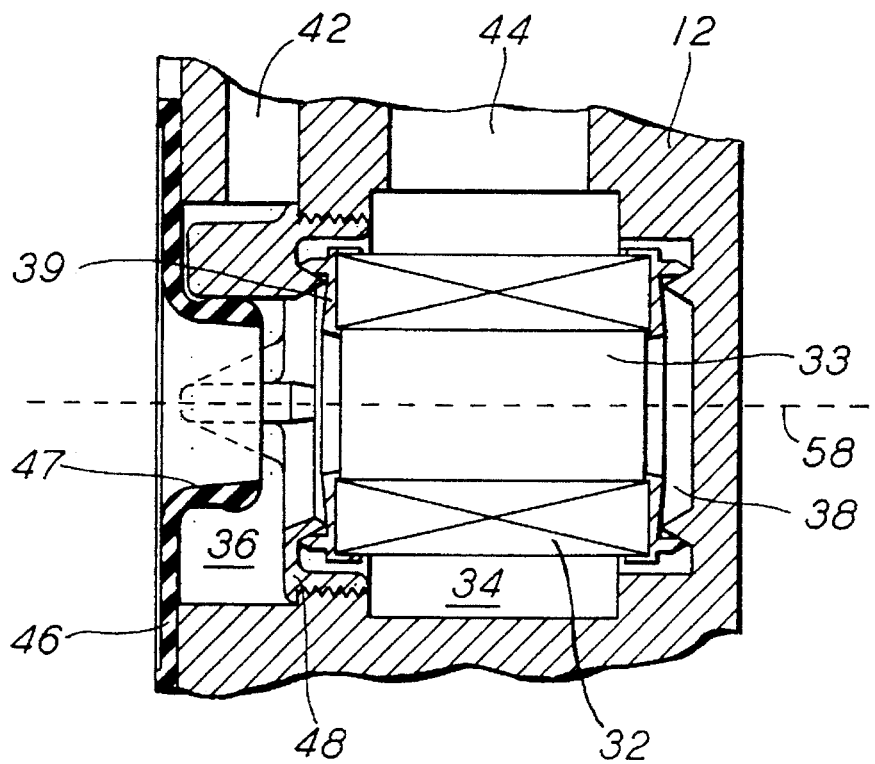
FIG. 4 is a cross sectional view taken in elevation of the preferred filter and retaining nut arrangement within the preferred pipe bracket portion.

Referring next to FIG. 4, the pipe bracket portion is shown with the filter 32, the mountings, the retaining nut 48 and gasket 46 positioned within cavity 30. Filter 32 is provided within cavity 30 and has a first axial end portion 38. First axial mounting portion 38 of filter 13 is positioned within cavity 30 at an end of cavity 30 opposite to cavity opening 31. Filter mounting 38 is sized and configured to seat and seal filter 32 within cavity 30. Filter 32 is preferably generally cylindrical, is generally porous and preferably has an axial opening 33 provided centrally through the longitudinal axis of the filter 32. Axial end portion 38 of filter 32 abuts and is in sealing contact with a wall of cavity 30 opposite to cavity opening 31. Thus, air may not enter or exit filter 32 at the axial end portion 38. An axial end portion 39 of filter 32 is on the outer end of filter 32 opposite to axial end portion 38.

Figure 5:
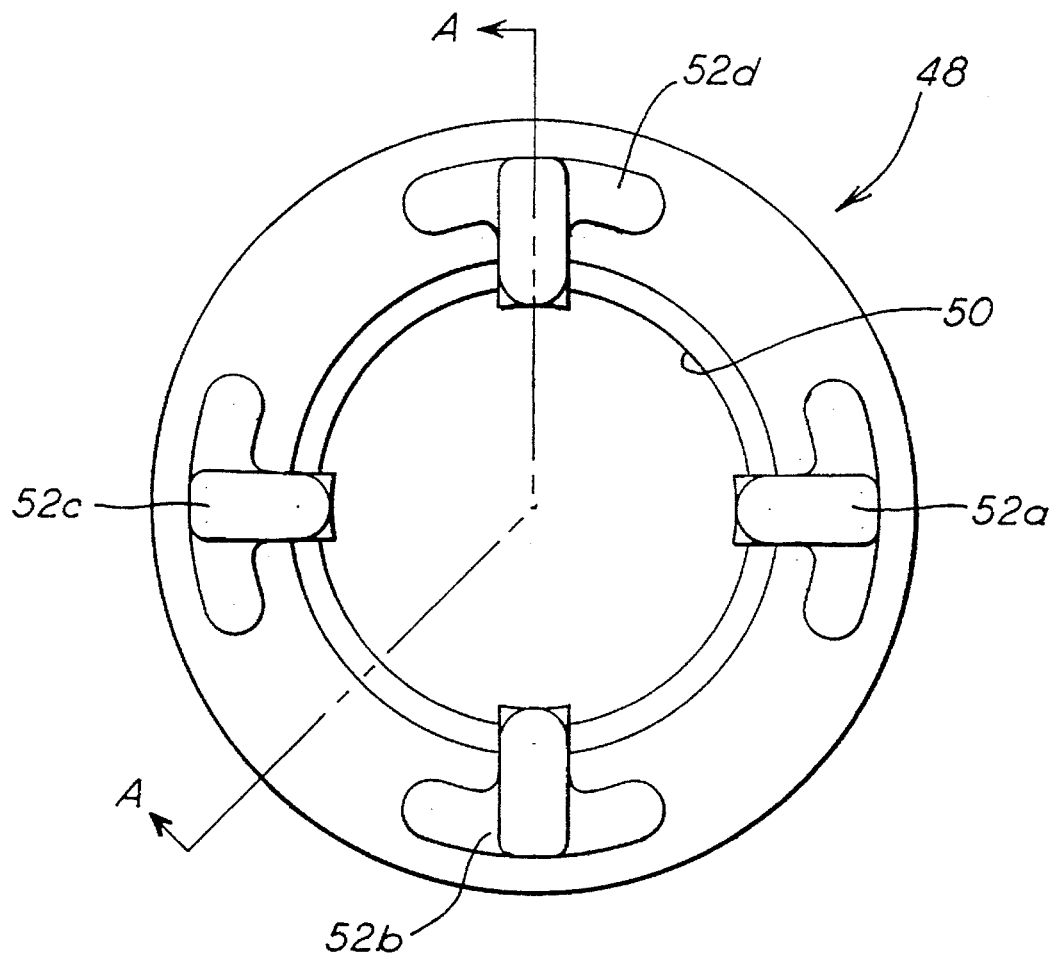
FIG. 5 is a top elevational view of a preferred filter for use with a pipe bracket.
Figure 6:
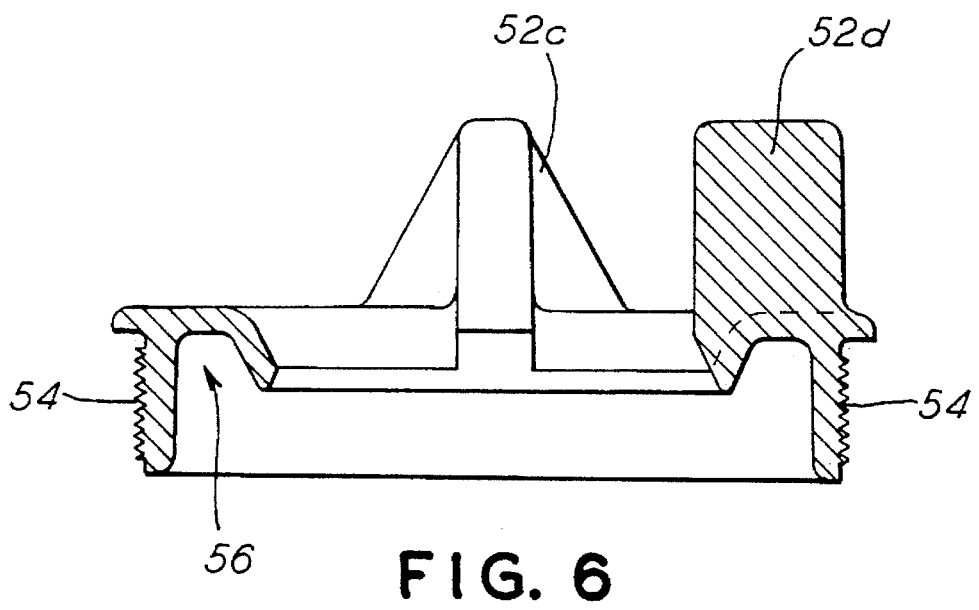
FIG. 6 is a sectional view taken along Section A—A of FIG. 5.

A retaining nut 48 is then provided within cavity 30. Retaining nut 48 will be described in detail with reference to FIGS. 5 and 6. As can be seen in FIG. 5, retaining nut 48 is generally annular. Any number, and preferably four raised portions 52 and extend outward on retaining nut 48. The raised portions 52 are radially spaced upon retaining nut 48. The raised portions 52 provide a surface for supporting a gasket 46, preventing the gasket 46 from moving into port 42. Also, a throughbore 50 is provided through retaining nut 48. Preferably, throughbore 50 is provided centrally through retaining nut 48. As can be seen best in FIG. 6, retaining nut 48 is configured such that an annular recess 56 is formed on a side of retaining nut 48 opposite to raised portions 52. Retaining nut 48 is preferably fabricated of plastic, preferably nylon, but may be fabricated of any suitable material or composite of materials.

Referring again to FIG. 4, retaining nut 48 is inserted into cavity 30 with the retaining nut annular recess 56 being seated upon filter portion 39. The retaining nut 48 has threading 54 provided circumferentially thereupon that is threadably engagable to threading 45 of pipe bracket portion 12. Preferably, retaining nut 48 is threadably engaged to pipe bracket portion 12 intermediate between brake pipe inlet 44 and port 42. Port 42 is then located radially outward from retaining nut 48.

Retaining nut 48 thereby secures cylindrical filter 32 within cavity 30 and intersects cavity 30 forming a first cavity portion 34 and second cavity portion 36. The first cavity portion 34 and second cavity portion 36 are connected by retaining nut throughbore 50 after passing through filter 32. Filter 32 is provided within the first cavity portion 34. Second cavity portion 36 comprises the remainder of cavity 30 on the other side of retaining nut 38 from filter 32. As can be seen in FIG. 4, the brake pipe inlet 44 connects to the first cavity portion 34 of cavity 30. Thus, air flow enters from brake pipe inlet 44 into first cavity portion 34. As each axial end 38, 39 of filter 32 is sealed by the cavity wall and retaining nut 48, respectively, the air flow must pass radially through filter 32. Air then enters axial filter opening 33 and travels through retaining nut throughbore 50 into the second cavity portion 36. The air flow may then travel out the radial port 42 or out of cavity opening 31.

A gasket 46 is provided on the first side 14 of the pipe bracket portion 12 at cavity opening 31. Gasket 46 has an opening 47 provided therethrough. Gasket opening 47 provides the opening through which air may travel from cavity 30 through cavity opening 31 and to the emergency portion 20. Thus, the radial port 42 and the gasket opening 47 open to the second cavity portion 36 of cavity 30. Gasket 46 may be fabricated of any suitable nonporous, sealing material.

Cylindrical filter 32 is preferably oriented within cavity 30 such that the longitudinal axis of cylindrical filter 32 (depicted as dotted line 58 in FIG. 4) is generally perpendicular to the first side 14 of pipe bracket portion 12. Therefore, air which enters the pipe bracket portion 12 through brake pipe inlet 44 enters radially into cylindrical filter 32 and exits axially outward from filter 32 through axial filter opening 33. Furthermore, axial end portion 39 of the filter 32 abuts and is in sealing contact with the retaining nut 48. The axial filter opening 33 connects to retaining nut throughbore 50.

Therefore, when air exits axially from filter 32, retaining nut 48 seals first cavity portion 34 so that air may only exit from axial filter opening 33 through the retaining nut throughbore 50. The radial spacing of raised portions 52, seen best in FIGS. 5 and 6, allow for air to pass between the raised portions 52. Thus, the air may then flow directly out of gasket opening 47 into emergency portion 20 and may flow between raised portions 52 into second cavity portion 36 at which time the air may flow through radial port 42 into the service portion 18.

Other variations of the preferred embodiment could be made. For example, although four raised portions of the retaining nut are shown, any number of raised portions may be utilized. Also, although the throughbore of the retaining nut is preferably provided centrally through the retaining nut, the throughbore may be provided at any location on the retaining nut. Furthermore, although the filter is preferably cylindrical, the filter may be other configurations.

While certain present preferred embodiments have been shown and described, it is distinctly understood that the invention is not limited thereto but may be otherwise embodied within the scope of the following claims.

I claim:

1. A pipe bracket portion for use in a freight brake control valve of a rail freight vehicle, wherein such control valve of the type having connections to a brake pipe, a brake cylinder, an emergency reservoir and an auxiliary reservoir, such control valve further of the type having a service portion and an emergency portion mounted to said pipe bracket, such pipe bracket portion comprising:

a first side of said pipe bracket portion having means for mounting such service portion and means for mounting such emergency portion thereto;

a second side of said pipe bracket portion opposite to said first side, wherein said second side having means for connecting to such brake pipe, such brake cylinder, such emergency reservoir and such auxiliary reservoir;

cavity means having an opening that opens to said first side, said cavity being provided within said pipe bracket portion for mounting a cylindrical filter therewithin;

retaining nut means for securing said cylindrical filter in said cavity means, said retaining nut means forming a first cavity portion and a second cavity portion within said cavity means, said retaining nut means further providing sealing between the circumference of one end of said cylindrical filter and said second cavity portion, wherein said first cavity portion containing said cylindrical filter and said second cavity portion having at least one radial port therein;

said retaining nut means having a throughbore to permit air flow from said first cavity portion to said second cavity portion;

said retaining nut means having at least one raised portion and at least one reduced portion, wherein said at least one raised portion extends into said second cavity portion; and wherein airflow from said brake pipe enters said first cavity portion, radially entering said filter, axially exiting said filter, passing through said throughbore into said second cavity portion and exiting said second cavity portion at at least one of said radial port and said opening on said pipe bracket portion first side.

2. The pipe bracket portion of claim 1 wherein said raised portions extend into said second cavity portion to an extend intermediate said radial port and said first side.

3. The pipe bracket portion of claim 2 wherein said filter is mounted within said cavity means such that a longitudinal axis of said filter is generally perpendicular to said first side of said pipe bracket portion.

4. The pipe bracket portion of claim 2 wherein said at least one raised portion is comprised of a plurality of raised portions, wherein said raised portions are radially spaced around said retaining nut.

5. The pipe bracket portion of claim 1 wherein said at least one raised portion of said retaining nut means providing radial support to a portion of a gasket mounted at said cavity opening on a side of said one of said emergency portion and said service portion, preventing said gasket from movement into said radial port.

6. The pipe bracket portion of claim 5 wherein said radial port connects to the other of said service portion and said emergency portion as said cavity opening.

7. The pipe bracket portion of claim 1 wherein said retaining nut means is threadably engaged to said pipe bracket portion intermediate to said first cavity portion and said second cavity portion.

* * * * *